United States Patent
Huras et al.

(10) Patent No.: US 8,250,111 B2
(45) Date of Patent: Aug. 21, 2012

(54) AUTOMATIC DETECTION AND CORRECTION OF HOT PAGES IN A DATABASE SYSTEM

(75) Inventors: Matthew Albert Huras, Ajax (CA); Keriley Kay Romanufa, Scarborough (CA); Aamer Sachedina, Queensville (CA); Xun Xue, Markham (CA)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/394,786

(22) Filed: Feb. 27, 2009

(65) Prior Publication Data

US 2010/0223243 A1    Sep. 2, 2010

(51) Int. Cl.
*G06F 17/30* (2006.01)

(52) U.S. Cl. ........................................ 707/802

(58) Field of Classification Search ............... 707/8, 802
See application file for complete search history.

(56) References Cited

U.S. PATENT DOCUMENTS

| | | | | |
|---|---|---|---|---|
| 4,277,826 A * | 7/1981 | Collins et al. | ................. | 711/206 |
| 5,778,388 A * | 7/1998 | Kawamura et al. | ................. | 1/1 |
| 5,960,429 A * | 9/1999 | Peercy et al. | ................. | 709/217 |
| 6,088,710 A * | 7/2000 | Dreyer et al. | ................. | 715/246 |
| 6,246,993 B1 * | 6/2001 | Dreyer et al. | ................. | 705/7.26 |
| 6,470,330 B1 * | 10/2002 | Das et al. | ................. | 707/718 |
| 6,549,895 B1 * | 4/2003 | Lai | ................. | 707/742 |
| 6,668,263 B1 * | 12/2003 | Cranston et al. | ................. | 1/1 |
| 6,792,432 B1 | 9/2004 | Kodavalla et al. | | |
| 6,961,835 B2 * | 11/2005 | Lightstone et al. | ................. | 711/171 |
| 7,007,146 B2 * | 2/2006 | Romanufa et al. | ................. | 711/165 |
| 7,152,102 B2 * | 12/2006 | Brinton et al. | ................. | 709/223 |
| 7,571,188 B1 * | 8/2009 | Schwetman et al. | ................. | 1/1 |
| 7,707,195 B2 * | 4/2010 | Nettleton et al. | ................. | 707/704 |
| 7,865,527 B2 * | 1/2011 | Bendapudi | ................. | 707/793 |
| 7,921,085 B2 * | 4/2011 | Guo et al. | ................. | 707/688 |
| 7,958,114 B2 * | 6/2011 | Chaudhuri et al. | ................. | 707/719 |
| 2004/0078541 A1 * | 4/2004 | Lightstone et al. | ................. | 711/171 |
| 2004/0168035 A1 * | 8/2004 | Romanufa et al. | ................. | 711/165 |
| 2005/0289188 A1 * | 12/2005 | Nettleton et al. | ................. | 707/200 |
| 2006/0224594 A1 | 10/2006 | Goyal et al. | | |
| 2007/0299843 A1 | 12/2007 | Deshpande | | |
| 2008/0243761 A1 * | 10/2008 | Guo et al. | ................. | 707/2 |
| 2009/0254522 A1 * | 10/2009 | Chaudhuri et al. | ................. | 707/3 |

\* cited by examiner

*Primary Examiner* — Sheree Brown
(74) *Attorney, Agent, or Firm* — Patterson & Sheridan, LLP

(57) ABSTRACT

According to one embodiment of the present invention, a method of detecting and correcting hot pages in a database system includes monitoring transactions involving pages in a database and determining if one of the transactions had to wait for access to one of the pages; incrementing a page contention counter each time one of the transactions had to wait for access to one of the pages. The method then determines if the page contention counter exceeds a predetermined threshold and monitors transactions on one of the pages for which the page contention count was exceeded. The method then determines if a row was accessed in the page for which the page contention count was exceeded and increments a reference count for the accessed row. The accessed rows are flagged when the reference count exceeds a second predetermined threshold. The flagged rows are moved to another page in the database.

18 Claims, 3 Drawing Sheets

AUTOMATIC DETECTION AND CORRECTION OF HOT PAGES IN A DATABASE SYSTEM

BACKGROUND

The present invention relates to database systems, and more specifically, to the detection and correction of hot pages in a database system.

In database systems, such as relational database management systems, data is stored in pages (blocks) that have tables. Each table has rows (records) and columns (fields or attributes). When a page of data is being accessed and/or updated, it is latched in an exclusive state. Read access to a page typically requires the page to be latched in a shared state. As long as the page is latched in exclusive mode, it cannot be accessed or updated by any other process. A share latch may allow reads, but not updates by another process. In many situations, an accessing or updating process must first release the latched page before other processes may access it. When another process or thread attempts to access a latched page, there is said to be "contention" for the latched page. Contentions can be either read-write contention or write-write contention. Such page contention results in delay (also called "sleep states") as the process or thread wanting to access the latched page waits for the page to be released.

Page contention can significantly degrade overall system performance. A key cause of such contention occurs when: a) two or more rows are stored on a page; b) at least one of these rows is frequently updated; and c) at least one other row is somewhat frequently read or updated by concurrent transactions. When these conditions exist, a page can be a performance bottleneck because the page is latched in an exclusive mode that prevents other processes from accessing it. It often requires much time and effort on the part of administrators to detect and correct such problems when they exist.

SUMMARY

According to one embodiment of the present invention, a method comprises: detecting pages in a database having a high level of contention; detecting rows within the detected pages having a high access rate; and moving the detected rows from the detected pages to other pages in the database.

According to another embodiment of the present invention, a method comprises: monitoring transactions involving pages in a database; determining if one of the transactions had to wait for access to one of the pages; incrementing a page contention counter each time one of the transactions had to wait for access to one of the pages; determining if the page contention counter exceeds a predetermined threshold; monitoring transactions on one of the pages for which the page contention count was exceeded; determining if a row was accessed in the page for which the page contention count was exceeded; incrementing a reference count for the accessed row; flagging the accessed rows when the reference count exceeds a second predetermined threshold; and moving the flagged rows to another page in the database.

According to a further embodiment of the present invention, a system comprises: a database having pages, wherein each page includes rows of data; means for detecting the pages having a high level of contention; means for detecting rows within the detected pages having a high access rate; and means for moving the detected rows from the detected pages to other pages in the database.

According to another embodiment of the present invention, a computer program product for detecting and correcting hot pages in a database system comprises: a computer usable medium having computer usable program code embodied therewith, the computer usable program code comprising: computer usable program code configured to: detect pages in a database having a high level of contention; detect rows within the detected pages having a high access rate; and move the detected rows from the detected pages to other pages in the database.

DETAILED DESCRIPTION

Embodiments of the invention provide a system that automatically detects and corrects problems with page contention in database systems. The result is a system that significantly reduces human costs by eliminating the need for administrators to detect and correct such page contention problems.

Embodiments of the invention accomplish this by: a) automatically detecting pages that have a high level of contention (hot pages); b) (optionally) for such pages, automatically detecting rows that have a high access rate (hot rows); and c) automatically moving rows from hot pages to other pages in order to decrease the chances of contention on these pages based on concurrent access to different rows on the page. In one embodiment, these row moves would be accomplished in an online fashion using the online row movement technique described in U.S. Pat. No. 6,950,834, which is incorporated herein by reference in its entirety for all purposes. In one embodiment, if there are N hot rows on a page, N−1 of these rows would be moved, each to a different, non-hot, page.

The invention can be applied to single-system databases, as well as cluster databases, such as Oracle Real Application Clusters (RAC), or the DB2/Z Sysplex.

Figure 1:
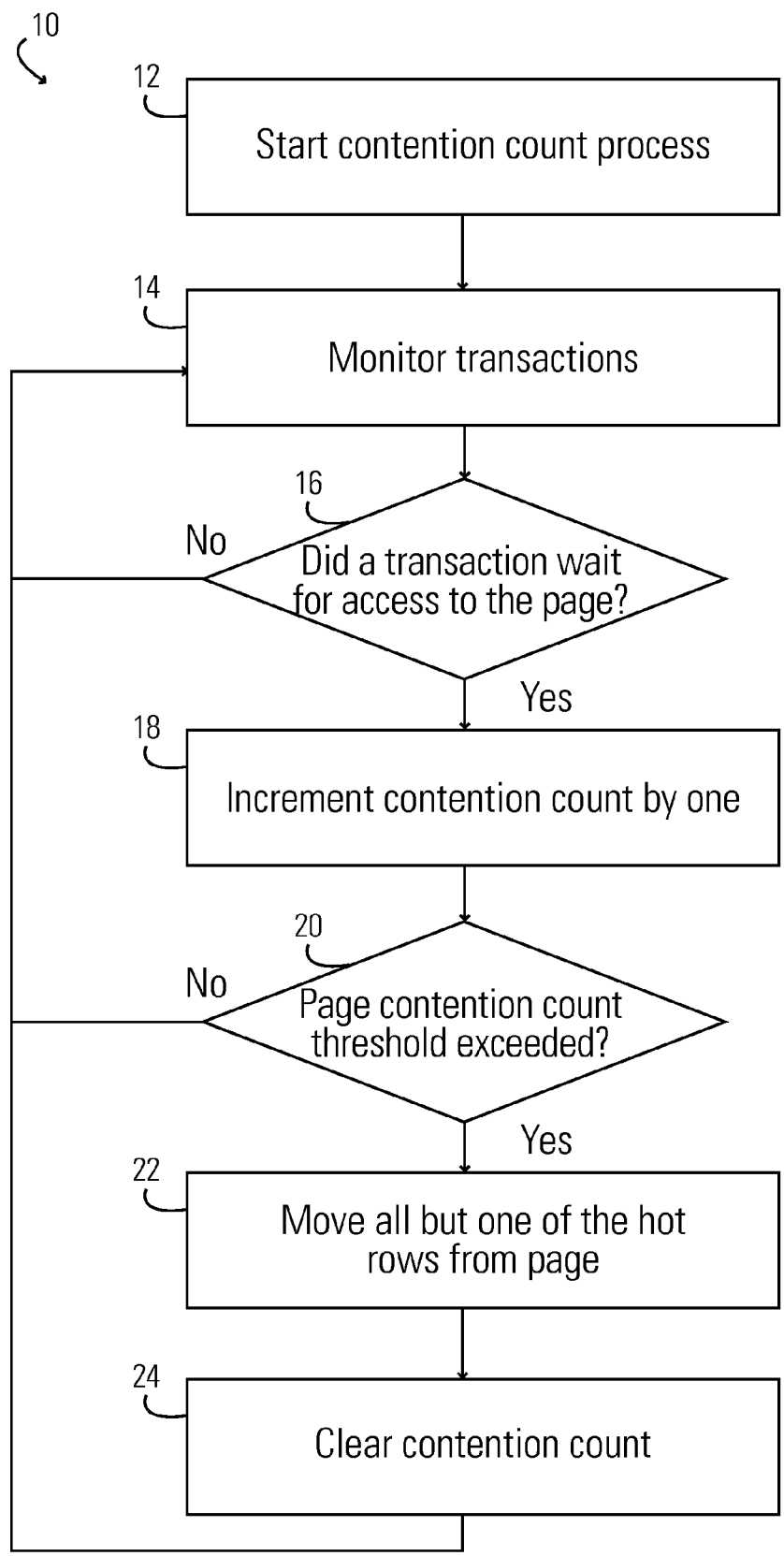
FIG. 1 shows a flowchart of a process for detecting and correcting hot pages in a database in accordance with an embodiment of the invention.

FIG. 1 is a flowchart of a method 10 of automatically detecting and moving hot pages in accordance with one embodiment of the invention. It will be appreciated that this is one example, and that the invention may be implemented in various alternative ways. In step 12 the contention count process is initiated for a page. Transactions involving the page are then monitored, in step 14. In step 16, it is determined whether a monitored transaction had to wait for access to the page. If not, no action is taken and the process returns to step 14 and further transactions are monitored. If the transaction did have to wait for access to a page, then step 18 will increment a contention counter by one. In one embodiment, the contention count may be maintained in the in-memory metadata, also referred to as a "descriptor" associated with the page.

The process then determines if a predetermined page contention count threshold has been exceeded for the page. If not, the process returns to step 14 and monitors additional transactions. If the page contention count threshold has been exceeded, step 22 moves all but one of the hot rows on the page to a different page. The determination of which rows are hot rows may be made according to the process described below and shown in FIG. 2. Step 24 then will clear the contention count and the process will return to step 14 to monitor additional transactions. If the page contention count threshold had not been exceeded, as determined by step 20, the process 10 returns to step 14 to monitor additional transactions.

In accordance with one embodiment, the contention count also may also be cleared if the page is evicted from the buffer pool. It will be appreciated that when the size of the buffer pool is smaller than the size of the database, to bring in a page of database to the buffer pool, an existing page in the buffer pool may have to be evicted from the buffer pool to make room for the new page. However, this would not likely materially decrease the effectiveness of the approach, since such an occurrence would very likely indicate the page is no longer hot.

While the foregoing assumes that the database is a single-system database, in cluster databases, such as Oracle RAC, or the DB2/Z sysplex, the 'contention count' could reflect the number of times the page was contended for across cluster nodes. Thus, once the contention count crosses a threshold, a background low-priority task would be triggered to move rows from the page.

Automatic detection of hot rows can be implemented in several ways. In one embodiment, a 'reference count' could be maintained on the page with each row. That is, each entry in the array, often called the page 'slot directory', could include a small number (e.g. 4 or 8) bits to store a reference count. Alternatively, the 'reference count's could be stored in memory associated with the page descriptor, which would eliminate the need for changing the page format. Also, memory requirements could be minimized by only maintaining row reference counts when a page is deemed to be 'hot' (i.e. when the page contention count crosses a threshold). Dynamically allocated memory may be used for such reference counts. In one embodiment, a cache of only the last 'n' accessed rows on a page are maintained. The reference counts could be cleared when the page contention count is cleared.

Figure 2:
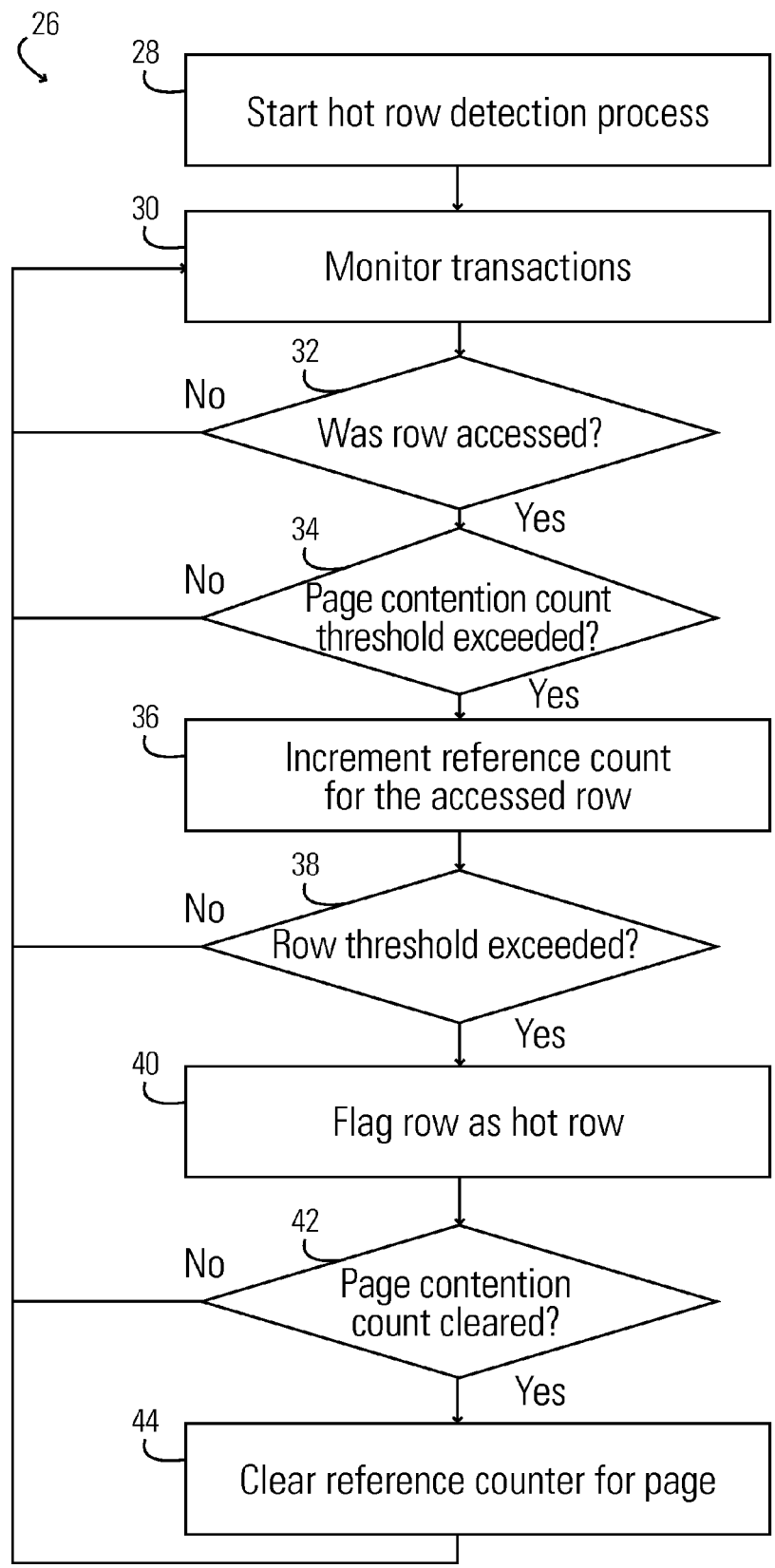
FIG. 2 shows a flowchart of a process for detecting hot rows in a database table used with the process shown in FIG. 1 in accordance with an embodiment of the invention.

FIG. 2 shows a flowchart of a process 26 for the automatic detection of hot rows in one embodiment of the invention, as described above. In step 28, the hot row detection process is started. In step 30, the process monitors all transactions on a page. The process 26, then determines if a row was accessed, in step 32. If not, the process returns to step 30 to monitor additional transactions. If a row was accessed, step 34 determines if the page contention count threshold has been exceeded. This may be the same contention count as the contention count threshold described in FIG. 1. If the page contention count threshold has not been exceeded, the process 26 returns to step 30. If the page contention threshold has been exceeded, then the process 26 increments the reference count for the accessed row, in step 36. Step 38 determines if a predetermined row threshold has been exceeded. If not, the process returns to step 30. If the predetermined row threshold has been exceeded, then that row is flagged as a hot row, in step 40. This information is then used in step 22 in the process 10 shown in FIG. 1 to determine which rows to move. Step 42 determines if the page contention count has been cleared, for example, in step 24 in FIG. 1. If not, the process 26 returns to step 30. If the page contention count has been cleared, then step 44 clears the reference counter for the page, and the process returns to step 30.

Online movement of rows to different pages may be accomplished using the forwarding pointer mechanism described in the previously incorporated by reference U.S. Pat. No. 6,950,834. This movement of rows to different pages may be done by a background, low-priority task, so as to minimize impact on the online workload.

There are a number of ways to decide which rows to move, and which pages to move them to. In one embodiment, all but one hot row would be moved to different pages. Also, in another embodiment, the target pages the rows are moved to may be chosen in way that avoids other hot pages. For example the target pages may first be checked to insure that the contention count for the page is below a predetermined threshold, which may be lower than the aforementioned page contention count threshold.

It is noted that the above description assumes hot pages are data pages. However, embodiments of the invention may also be applied to index pages. For example, in one embodiment, the above-described embodiments may be modified so that hot keys and/or record identifiers (RIDs) may be tracked in the slot directory or buffer descriptor as described above for hot rows. The term "keys" refers to collective selected fields (or attributes) used for an index on a table. RIDs uniquely identify records in the database table.

The online movement of rows to different pages may then be accomplished using an index page split algorithm. In one embodiment, the hot keys and/or RIDs would not be divided evenly, as is often done for page splits. Instead, the hot keys and/or RIDs would be divided so as to evenly distribute the hot keys on the existing and new index page.

As can be seen from the above disclosure, embodiments of the invention provide a system, method and computer program product for the automatic detection and correction of hot pages in a database system. As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
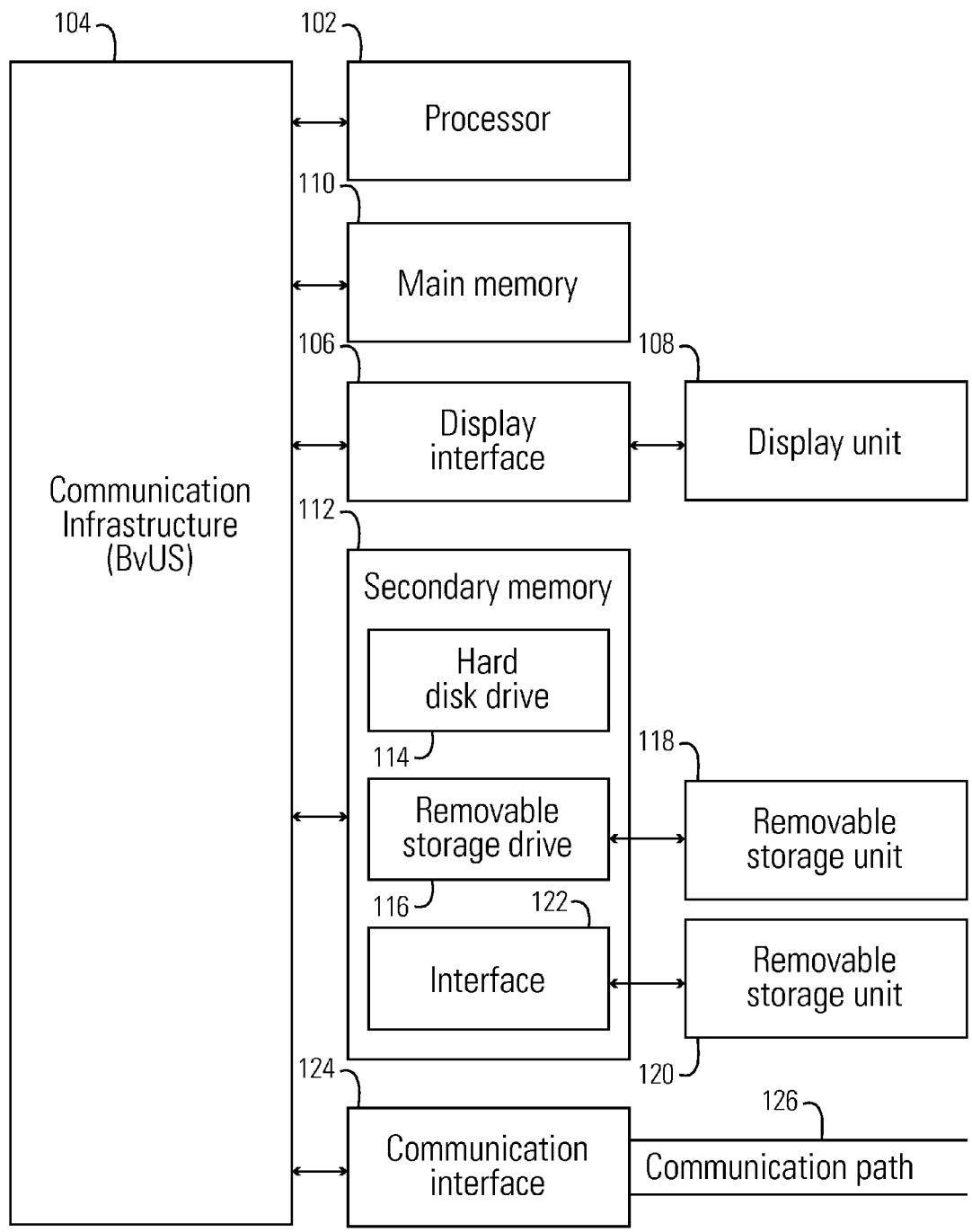
FIG. 3 shows a high level block diagram of an information processing system useful for implementing one embodiment of the present invention.

FIG. 3 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   in a database, detecting pages having a level of contention higher than a predetermined threshold by measuring a number of times any one of a plurality of transactions had to wait for access to one of said pages;
   detecting rows within said detected pages having a high access rate; and
   moving said detected rows from said detected pages to other pages in said database,
   wherein said detecting pages comprises,
      monitoring the plurality of transactions involving said pages;
      determining that the one of said plurality of transactions had to wait for access to the one of said pages;
      incrementing a page contention counter each time the one of said transactions had to wait for access to the one of said pages; and
      determining if said page contention counter exceeds the predetermined threshold, and
   wherein said detecting rows comprises,
      for those monitored transactions on a given page of said pages:
         determining if a row was accessed in the given page for which the predetermined threshold was exceeded;
         incrementing a reference count for said accessed row; and
         flagging said accessed row when said reference count exceeds a second predetermined threshold.

2. The method according to claim 1, wherein said moving comprises moving said rows to pages which have a low level of contention.

3. The method according to claim 1, further comprising storing said page contention counter in in-memory meta-data.

4. The method according to claim 1, further comprising clearing said page contention counter each time said detected rows are moved from said detected pages.

5. The method according to claim 1, further comprising clearing said page contention counter each time said page is evicted from a buffer pool.

6. The method according to claim 1, wherein said moving comprises moving all but one of said detected rows from a page.

7. The method according to claim 1, wherein said database is a cluster database and wherein said page contention counter reflects the number of times a page was contended across cluster nodes.

8. A method comprising:
   monitoring transactions involving pages in a database;
   determining if one of said transactions had to wait for access to one of said pages;
   incrementing a page contention counter each time one of said transactions had to wait for access to one of said pages;
   determining if said page contention counter exceeds a predetermined threshold;
   monitoring transactions on one of said pages for which said page contention count was exceeded;
   determining if a row was accessed in said page for which said page contention count was exceeded;
   incrementing a reference count for said accessed row;
   flagging said accessed rows when said reference count exceeds a second predetermined threshold; and
   moving said flagged rows to another page in said database.

9. The method according to claim 8, further comprising maintaining a cache of said reference counts for only the most recently accessed rows.

10. The method according to claim 8, further comprising clearing said page contention counter each time said flagged rows are moved from said pages.

11. A computer program product for detecting and correcting hot pages in a database system, said computer program product comprising:
   a non-transitory computer readable storage medium having computer usable program code embodied therewith, said computer usable program code comprising:
   computer usable program code configured to:
      detect pages in a database having a level of contention higher than a predetermined threshold by measuring a number of times any one of a plurality of transactions had to wait for access to one of said pages;

detect rows within said detected pages having a high access rate;
move said detected rows from said detected pages to other pages in said database;
monitor the plurality of transactions involving said pages;
determine that the one of said plurality of transactions had to wait for access to the one of said pages;
increment a page contention counter each time the one of said transactions had to wait for access to the one of said pages;
determine if said page contention counter exceeds the predetermined threshold; and
for those monitored transactions on a given page of said pages:
  determine if a row was accessed in the given page for which the predetermined threshold was exceeded;
  increment a reference count for said accessed row; and
  flag said accessed row when said reference count exceeds a second predetermined threshold.

12. The computer program product according to claim 11, wherein said moving moves said rows to pages which have a low level of contention.

13. The computer program product according to claim 11, wherein said computer usable program code is further configured to store said page contention counter in in-memory meta-data.

14. The computer program product according to claim 11, wherein said computer usable program code is further configured to clear said page contention counter each time said detected rows are moved from said detected pages.

15. A method, comprising:
detecting pages in a database having a high level of contention, said detecting pages including,
  incrementing a page contention counter each time a transaction of a plurality of transactions had to wait for access to one of said pages, and
  determining if said page contention counter exceeds a first predetermined threshold;
detecting rows within said detected pages having a high access rate, said detecting rows including,
  flagging said detected rows when a reference count exceeds a second predetermined threshold; and
moving said detected rows from said detected pages to other pages in said database.

16. The method according to claim 15, wherein said moving comprises:
moving said detected rows to pages which have a low level of contention.

17. The method according to claim 15, wherein said detecting pages further comprises:
monitoring the plurality of transactions involving said pages; and
determining that the transaction of the plurality of transactions had to wait for access to the one of said pages.

18. The method according to claim 17, wherein said detecting rows further comprises:
monitoring the plurality of transactions on a given page;
determining if a row was accessed in the page for which the first predetermined threshold was exceeded; and
incrementing the reference count for said accessed row.

* * * * *